US006996364B2

(12) United States Patent
Israel

(10) Patent No.: US 6,996,364 B2
(45) Date of Patent: Feb. 7, 2006

(54) BOOK OR CD USED AS ELECTRONIC KEY

(76) Inventor: David Israel, 721 Stendhal La., Cupertino, CA (US) 95014

( * ) Notice: Subject to any disclaimer, the term of this patent is extended or adjusted under 35 U.S.C. 154(b) by 164 days.

(21) Appl. No.: 10/249,974

(22) Filed: May 23, 2003

(65) Prior Publication Data

US 2004/0234935 A1 Nov. 25, 2004

(51) Int. Cl.
*G09F 17/30* (2006.01)

(52) U.S. Cl. .................. 434/317; 434/118; 434/307 R; 434/362

(58) Field of Classification Search ................. 434/118, 434/307 R, 317, 323.3, 62, 365; 709/217, 709/229, 231; 345/173; 713/176, 189
See application file for complete search history.

(56) References Cited

U.S. PATENT DOCUMENTS

| 4,855,725 | A  | * | 8/1989 | Fernandez .................. 345/173 |
| 5,597,307 | A  | * | 1/1997 | Redford et al. ............. 434/118 |
| 5,711,672 | A  | * | 1/1998 | Redford et al. ......... 434/307 R |
| 5,957,697 | A  | * | 9/1999 | Iggulden et al. ............ 434/317 |
| 6,311,214 | B1 | * | 10/2001 | Rhoads ....................... 709/217 |
| 2003/0014636 | A1 |  | 1/2003 | Ahlbrand |
| 2003/0093545 | A1 | * | 5/2003 | Liu et al. .................... 709/231 |
| 2004/0128514 | A1 | * | 7/2004 | Rhoads ....................... 713/176 |

* cited by examiner

Primary Examiner—Joe H. Cheng

(57) ABSTRACT

A system and method for providing electronic resources to those possessing a particular book(s) or CD. Electronic resources enhance the static published material by providing more recent information and exchange of ideas. Access to the electronic enhancements is limited to book or CD owners in a way that does not add complexity to the publishing process.

8 Claims, 1 Drawing Sheet

BOOK OR CD USED AS ELECTRONIC KEY

BACKGROUND OF INVENTION

1. Field of the Invention

The present invention relates generally to the field of multimedia publishing. More particularly, the invention pertains to published works used as resource access keys.

2. Prior Art

Since U.S. Pat. No. 5,957,697 to Iggulden, et al. of 1999, published work associated web resources become more prevalent. Unmoderated message boards, reviews, author interviews and other materials are available for many books, movies, games and music. However the resources are much smaller in scope than the enhancements possible.

Iggulden describes a method for the augmentation of published text different from the normal form of internet content. Iggulden also discusses access passwords: The password maybe imprinted on or in the book itself or may be printed on an insert that is included with the book at the time of purchase. The password may be common to all copies of book 100, but is preferably unique to each copy. Implementation of a unique password per book significantly changes book distribution. Even then the password can be easily given to users with no copy of the book.

The preferred method of Iggulden changes publishing and internet viewing methods and does not sufficiently secure the web content. The method described herein builds on prior art by describing a way to link books published with the traditional process with content presented in forms normal to the internet.

As the invention relates to CDs, U.S. patent application Ser. No. 20030014636, to Ahlbrand, details a system of strong encryption involving possession of a CD and a password known to the user. The password is unique to that user. The method and system described here differs in that only possession of the CD is required. No identification of the user's identity is necessary. Also since designed for a different application, Ahlbrand's invention does not apply to the format of existing CD sales.

SUMMARY OF INVENTION

The present invention provides a system and method for selling electronic resources to those possessing a particular published work(s). Electronic resources enhance a static book by providing more recent information and exchange of ideas. Access to the electronic enhancements is limited by correct response to a challenge for the word contained at a particular page, line and number of words from the left edge of the book. Access to the electronic enhancements is limited to CD owners by electronically verifying possession of the CD.

DETAILED DESCRIPTION

Figure 1:
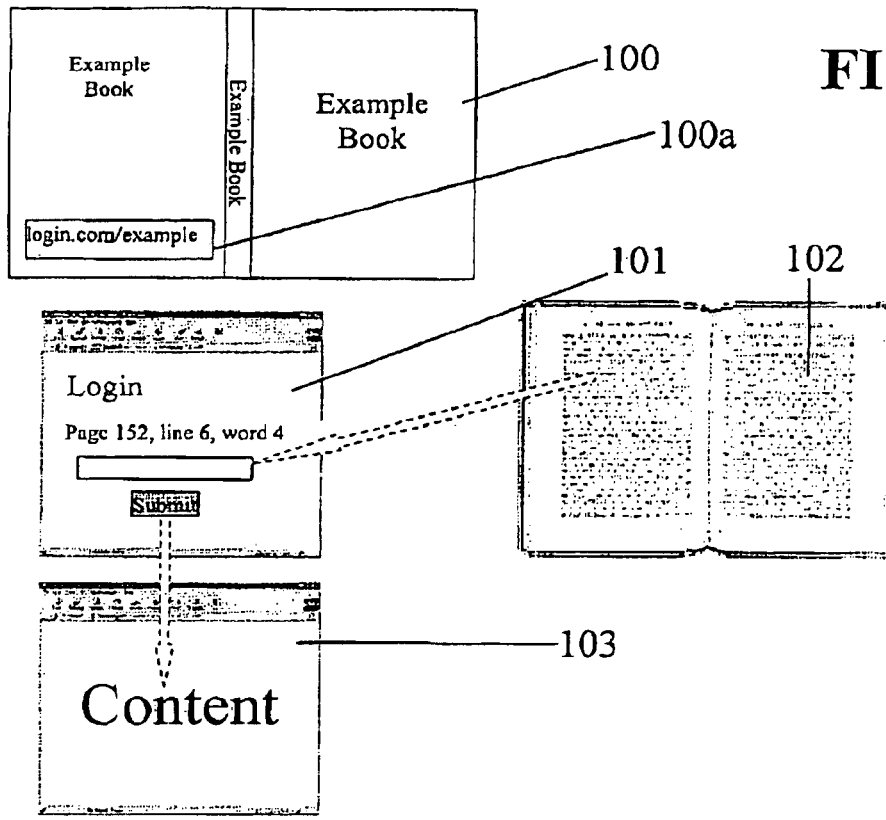
FIG. 1 illustrates a book and login in accordance with one embodiment of the invention.

FIG. 1 depicts an embodiment of the present invention. The system includes a printed book 102 and a corresponding jacket 100. A 100a is a URL contained on the jacket that leads, though not necessarily directly, to a login web page 101. At 101 the book owner is prompted to enter the word contained at a particular page, line and number of words from the left edge of the book 102. For instance, page 162, line 6 from the top, 5 words from the left. A variant of this method prompts for n words at a location instead of one word. Another variant has a prompt for page, paragraph, line and words from the left. The correct response to the prompt takes the user to a content web page 103.

The backend to 101 contains a database of book, page, line, words from left combinations. Software converts an electronic form of a printed book into a list of these combinations. The software is designed to avoid prompts for common words such as "a" and "the". The number of prompts chosen must be sufficient to prevent authentication using a small list of prompt responses. Each viewing of 101 uses another challenge response prompt from this database. In this way only users with 102 on hand are able to access 103.

Content 103 can augment a book in many ways: message boards, updated or supplementary materials, related short stories, music, short films, descriptions and photos of actual places mentioned in the book, computer games, internet links of interest, news letters, electronic means of correspondence with the author(s), frequently asked questions (FAQ), other content in a similar vein not explicitly listed. There may also be information available at 100a, such as advertisements and ability to order materials, not protected by 101.

Login 101 can be made to result in different content sites, 103, depending on the edition of a book. A different edition of a book, 102, will have or can be made to have a different typeset. The database behind 101 can then be set to prompt for book, page, line, word combinations that distinguish between 101 and its new edition.

Login 101 can also be enhanced to secure access to differing levels of content, 103, depending on the number of books from an author or publisher available to a user. 101 can list several prompts from several books so a user fills out all of the responses for books he has. The number of correct responses in the prompt list determines the content the user receives.

Figure 2:
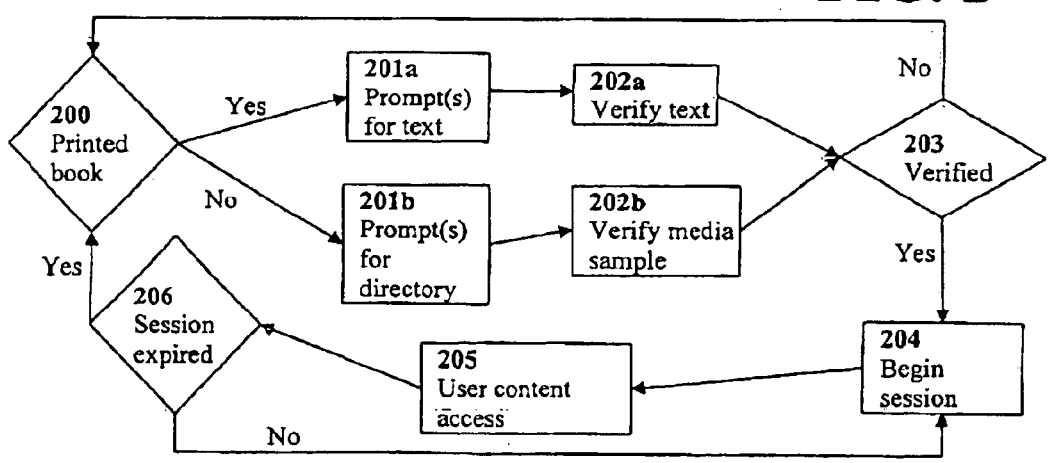
FIG. 2 is a flowchart describing a login procedure for the invention.

One skilled in the art will be aware of many details of implementing authentication. FIG. 2 depicts the invention's basic authentication starting at a 200. Correct response on a 201a or 201b results in a session that expires after a certain period of user inactivity. After session expiration subsequent access to a content 205 requires re-login.

FIG. 2 also shows an embodiment of the invention in which a 202b checks a part of the possessed data for match with the published data. This verification again requires a database of file locations and contained data combinations. In a more secure embodiment, 202b starts from software that auto runs when the CD is inserted into a computer. This alternate embodiment requires adding new software to the CD. In the case of multiple CDs and one CD drive, 202b prompts for the next CD after verification.

In a more secure embodiment, some or all of the protected contents at 103 are in downloadable documents that can only be read with special reader software. The reader software for the protected document prompts for the same login as 200. The back end for the downloadable document login may reside within the document or connect to a database on the internet. Reader software takes normal precautions to prevent conversion to non-protected formats.

Note that the ratio of protected to published content may vary. In an extreme form the published book or CD may be purely a mechanism for selling related web content.

A number of advantages of using a book or CD as an electronic key are evident: a) Assurance that only those possessing a published work will have access to the web content. b) Ability to publish multimedia using existing single media sales channels. c) Browsing web content through internet access at the point of sale helps purchase decisions. d) Prolonged shelf life; the work remains a key to more content.

What is claimed is:

1. A method for providing data comprising the steps of:

providing a printed book having a plurality of text covered pages including a URL corresponding to a web-site;

maintaining a database correlating a subset of words within the text to a location at which each of the words in the subset is found in the book;

wherein the location is described as a page, one or more of paragraph and line, and a word number;

maintaining content relevant to the book on the web-site;

prompting a user of the web-site with a location found in the database;

accepting a textual reply from the user; and providing access to the content when the reply is correlated to the specific location in the database.

2. The method of claim 1 wherein the content is selected from the group consisting of updates to the book, edited materials, information relating to communications with or from readers of the book, media incompatible with the publication of the book, and combinations thereof.

3. The method of claim 1 wherein content provided is determined in reference to an edition of the book.

4. The method of claim 1 wherein prompting the user comprises providing a list of prompts, each for a different book and specific location; and wherein the content provided varies by the number of replies that are correlated to the specific locations in the database.

5. A system for providing data comprising:

means for providing a printed book having a plurality of text covered pages including a URL corresponding to a web-site;

means for maintaining a database correlating a subset of words within the text to a location at which each of the words in the subset is found in the book; wherein the location is described as a page, one or more of paragraph and line, and a word number;

means for maintaining content relevant to the book on the web-site;

means for prompting a user of the web-site with a location found in the database;

means for accepting a textual reply from the user; and means for providing access to the content when the reply is correlated to the specific location in the database.

6. The system of claim 5 wherein the content is selected from the group consisting of updates to the book, edited materials, information relating to communications with or from readers of the book, media incompatible with the publication of the book, and combinations thereof.

7. The system of claim 5 wherein content provided is determined in reference to an edition of the book.

8. The system of claim 5 wherein the means for prompting the user comprises means for providing a list of prompts, each for a different book and specific location; and wherein the content provided varies by the number of replies that are correlated to the specific locations in the database.

* * * * *